United States Patent Office 3,527,713
Patented Sept. 8, 1970

3,527,713
METHOD OF PREPARING PLASTIC STABILIZING CONCENTRATE AND IMPROVED PRODUCT THEREFROM
Winfield S. Haynes, Jr., Freeland, and Floyd B. Nagle, Midland, Mich., assignors to The Dow Chemical Company, Midland, Mich., a corporation of Delaware
No Drawing. Filed Aug. 10, 1967, Ser. No. 659,600
Int. Cl. B01j 1/16; B02c 18/00; C08g 51/58
U.S. Cl. 252—403                                      9 Claims

ABSTRACT OF THE DISCLOSURE

Improved stabilizer concentrate is prepared by extruding a mixture of 2,6 - di-tert-butyl-p-cresol and 2-(2H-benzotriazol-2-yl)-p-cresol at a temperature below the melting point of 2 - (2H-benzotriazol-2-yl)-p-cresol. An improved pellet is obtained which disperses better in an extruder and has less tendency to dust.

This invention relates to an improved method for preparing a concentrate of 2,6-di-tert-butyl-p-cresol and 2-(2H - benzotriazol-2-yl)-p-cresol, and to an improved product therefrom, and more particularly relates to a method of extruding 2,6-di-tert-butyl-p-cresol and 2-(2H-benzotriazol-2-yl)-p-cresol at a temperature below the melting point of 2-(2H-benzotriazol-2-yl)-p-cresol to obtain a readily dispersible pellet.

2,6-di-tert-butyl-p-cresol and 2-(2H-benzotriazol-2-yl)-p-cresol are commonly employed as stabilizers in the fabrication of alkenyl aromatic resins such as polystyrene, polyvinyl toluene and the like. 2,6-di-tert-butyl-p-cresol and 2-(2H-benzotriazol-2-yl)-p-cresol are both usually employed in powder or pellet form, and in order to obtain the maximum benefits from the stabilizer and mixture, it must be dispersed generally uniformly within the resin being stabilized. Considerable difficulty has been encountered in conveniently admixing pellets or tablets of a mixture of 2-(2H-benzotriazol-2-yl)-p-cresol, 2,6-di-tert-butyl-p-cresol using a fatty acid as lubricant and binder with pelleted alkenyl aromatic resins such as polystyrene to form a dry blend and subsequently extrude the dry blend to a finished product. In screw extruders, there is apparently a tendency for such tablets to cause surging of the polymer melt in the extruder and to therefore have an undesirable effect upon the article of manufacture. Considerable difficulty has been encountered in some such pellets or tablets. Generally, lubricants such as fatty acids must be employed in order to obtain a coherent pellet or tablet. Oftentimes in the molding or fabrication of synthetic resinous materials such as polystyrene, it is desirable to add dyes and pigments by a dry blending process in order that the fabricated product has a desired color. Dry blending of pigments, from a quality point of view, is a relatively hazardous process, as uneven distribution of the dye or pigment in the resultant extruded product generally results in a commercially unacceptable material.

It is an object of this invention to provide an improved method for preparing a concentrate of 2,6-di-tert-butyl-p-cresol and 2-(2H-benzotriazol-2-yl)-p-cresol.

It is also an object of this invention to provide an improved stabilizer concentrate particularly suitable for polystyrene molding and extrusion.

It is also an object of this invention to provide an improved stabilizer concentrate with or without pigments or dyes which provides improved performance in cold feed extrusion.

These benefits and other advantages in accordance with the method of the present invention are achieved by admixing from 15 to 55 parts by weight of 2,6-di-tert-butyl-p-cresol with from 45 to 85 parts by weight of 2-(2H-benzotriazol-2-yl)-p-cresol at a temperature below about 125° C., 2 - (2H-benzotriazol-2-yl)-p-cresol being provided in the form of a granular solid, at least 80 weight percent passing through a 20 mesh U.S. Sieve Size screen, and preferably finer, with 90 weight percent passing through a 325 mesh U.S. Sieve Size screen, melting 2,6-di-tert-butyl-p-cresol to generally form a liquid matrix about the particles of 2-(2H-benzotriazol-2-yl)-p-cresol, cooling the mixture of 2,6 - di-tert-butyl-p-cresol and 2 - (2H- benzotriazol - 2 - yl)-p-cresol to a viscous paste-like consistency, forming the mixture of 2,6-di-tert-butyl-p-cresol and 2-(2H-benzotriazol-2-yl)-p-cresol into a desired configuration and cooling the mixture of 2,6-di-tert-butyl-p-cresol and 2 - (2H-benzotriazol-2-yl)-p-cresol to a temperature below about 80° C.

Also contemplated within the scope of the present invention is an improved stabilizer concentrate, the stabilizer concentrate comprising a particulate mass consisting essentially of from 45 to 85 parts by weight of 2-(2H-benzotriazol-2-yl)-p-cresol in finely divided particulate form admixed with and existing as a separate phase in a matrix of from 15 to 44 parts by weight of 2,6-di-tert-butyl-p-cresol.

For the practice of the present invention, 2,6-di-tert-butyl-p-cresol in any form from a granular solid to a molten liquid below about 125° C. may be employed. 2,6-di-tert-butyl-p-cresol of any commercial purity acceptable for resin stabilization processes may be used. 2-(2H-benzotriazol-2-yl)-p-cresol as employed for practice of the method of the present invention is utilized as a comminuted powder, beneficially 80 weight percent passing through a 20 mesh U.S. Sieve Size screen, and advantageously 90 weight percent passing through a 325 mesh U.S. Sieve Size screen, and being retained on a 400 mesh U.S. Sieve Size screen.

A wide variety of coloring matter such as oil-soluble dyes and pigments are beneficially utilized in forming mixtures of 2,6-di-tert-butyl-p-cresol and 2-(2H-benzotriazol-2-yl)-p-cresol. Generally, such pigments and dyes can be present up to about 5.0 weight percent of the amount of 2,6 - di-tert-p-cresol-2-(2H-benzotriazol-2-yl)-p-cresol mixture. Generally, as the level of dyes and pigments in synthetic resinous formulations is well below the weight level of the stabilizers employed, rarely are the maximum amounts approached. Excessive quantities of dyes or pigments tend to affect the strength of the resultant particle and may give rise to dusting.

In practice of the method of the present invention and preparation of the product, conventional screw extruders are readily employed. Generally, the major components, 2,6-di-tert-butyl-p-cresol and 2-(2H-benzotriazol-2-yl)-p-cresol, are available in particulate form. Beneficially, they are either dry blended or continuously fed to the feed port of a screw extruder where they are admixed, forwarded and heated to a temperature between about 82° C. and 110° C., passed from the screw extruder as a viscous paste, severed into pellets and cooled below 80° C. to provide a relatively non-dusting pellet. If it is desirable to add dyes or pigments, these are readily added by dry blending or addition to the feed port of the extruder. It is critical and essential to the practice of the present invention that 2-(2H-benzotriazol-2-yl)-p-cresol is not heated to or above its melting point; as adverse effects are obtained on some dyes, giving rise to color change, processing is difficult, and weaker particles are obtained which have an undesirable low bulk density.

By way of further illustration, the following compositions are extruded wherein the maximum temperature of the mixture reached is about 100° C. and the product subsequently pelleted by means of a die face cutter and cooled to room temperature.

TABLE

| Weight percent 2,6-di-tert-butyl-p-cresol: | Weight percent 2-(2H-benzotriazol-2-yl)-p-cresol |
|---|---|
| 15 | 85 |
| 25 | 75 |
| 35 | 65 |
| 55 | 45 |

In each case, solid generally void-free pellets are obtained that exhibit little or no tendency for dusting and disperse well when admixed with granular polystyrene and fed to an extruder.

Similar beneficial results are obtained when up to 5.0 weight percent of the following dyes or pigments, or mixtures thereof are incorporated in the dry blend prior to extrusion: titanium dioxide, Color Index No. 77891; Ultramarine Blue, Color Index No. 77007; CI Solvent Violet No. 13, Color Index No. 60725; Calco Alizarine Green Base Z, Color Index No. 61565; Oil Red, Color Index No. 12170; Calco Oil Red, Color Index No. 26105; Calco Chiniline Yellow ZSS, Color Index No. 47000, and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method of preparing a particulate stabilizer mixture comprising:
    admixing from 15 to 55 parts by weight of 2,6-di-tert-butyl-p-cresol with from 45 to 85 parts by weight of 2-(2H-benzotriazol-2-yl)-p-cresol at a temperature below about 125° C., 2-(2H-benzotriazol-2-yl)-p-cresol being provided in the form of a granular solid, at least 80 weight percent passing through a 20 mesh U.S. Sieve Size screen,
    melting the 2,6-di-tert-butyl-p-cresol to generally form a liquid matrix about the particles of 2-(2H-benzotriazol-2-yl)-p-cresol,
    cooling the mixture of 2,6-di-tert-butyl-p-cresol and 2-(2H-benzotriazol-2-yl)-p-cresol to a viscous paste-like consistency,
    forming the mixture of 2,6-di-tert-butyl-p-cresol and 2-(2H-benzotriazol-2-yl)-p-cresol into a desired configuration, and
    cooling the mixture of 2,6-di-tert-butyl-p-cresol and 2-(2H-benzotriazol-2-yl)-p-cresol to a temperature below about 80° C.

2. The method of claim 1 wherein the 2-(2H-benzotriazol-2-yl)-p-cresol passes about 90 weight percent through a 325 mesh U.S. Sieve Size screen.

3. The method of claim 1 including the step of admixing coloring matter with the 2,6-di-tert-butyl-p-cresol and 2-(2H-benzotriazol-2-yl)-p-cresol in a proportion up to 5 weight percent based on the amount of 2-(2H-benzotriazol-2-yl)-p-cresol.

4. The method of claim 1 wherein the mixture is mixed and formed in a screw extruder.

5. The method of claim 4 including the step of forming the mixture into a strandular configuration and severing the strand into particles at a temperature above about 80° C.

6. An improved stabilizer concentrate, the stabilizer concentrate comprising a particulate mass consisting essentially of from about 45 to 85 parts by weight of 2-(2H-benzotriazol-2-yl)-p-cresol in finely divided particulate form admixed with and existing as a separate phase in a matrix of from about 15 to about 55 parts by weight of 2,6-di-tert-butyl-p-cresol.

7. The concentrate of claim 6 wherein the 2-(2H-benzotriazol-2-yl)-p-cresol has a particle size which passes at least 80 weight percent through a 20 mesh U.S. Sieve Size screen.

8. The concentrate of claim 7 wherein the 2-(2H-benzotriazol-2-yl)-p-cresol passes at least 90 weight percent through a 325 mesh U.S. Sieve Size screen.

9. The concentrate of claim 6 containing up to 5 weight percent of coloring matter based on the weight of the 2,6-di-tert-butyl-p-cresol.

References Cited

UNITED STATES PATENTS 2,981,628   4/1961   Hall _____ 252—404X
3,218,332   11/1965  Heller et al. _____ 260—308

RICHARD D. LOVERING, Primary Examiner

I. GLUCK, Assistant Examiner

U.S. Cl. X.R.

260—45.8, 45.95, 308; 264—143